Patented Apr. 11, 1939

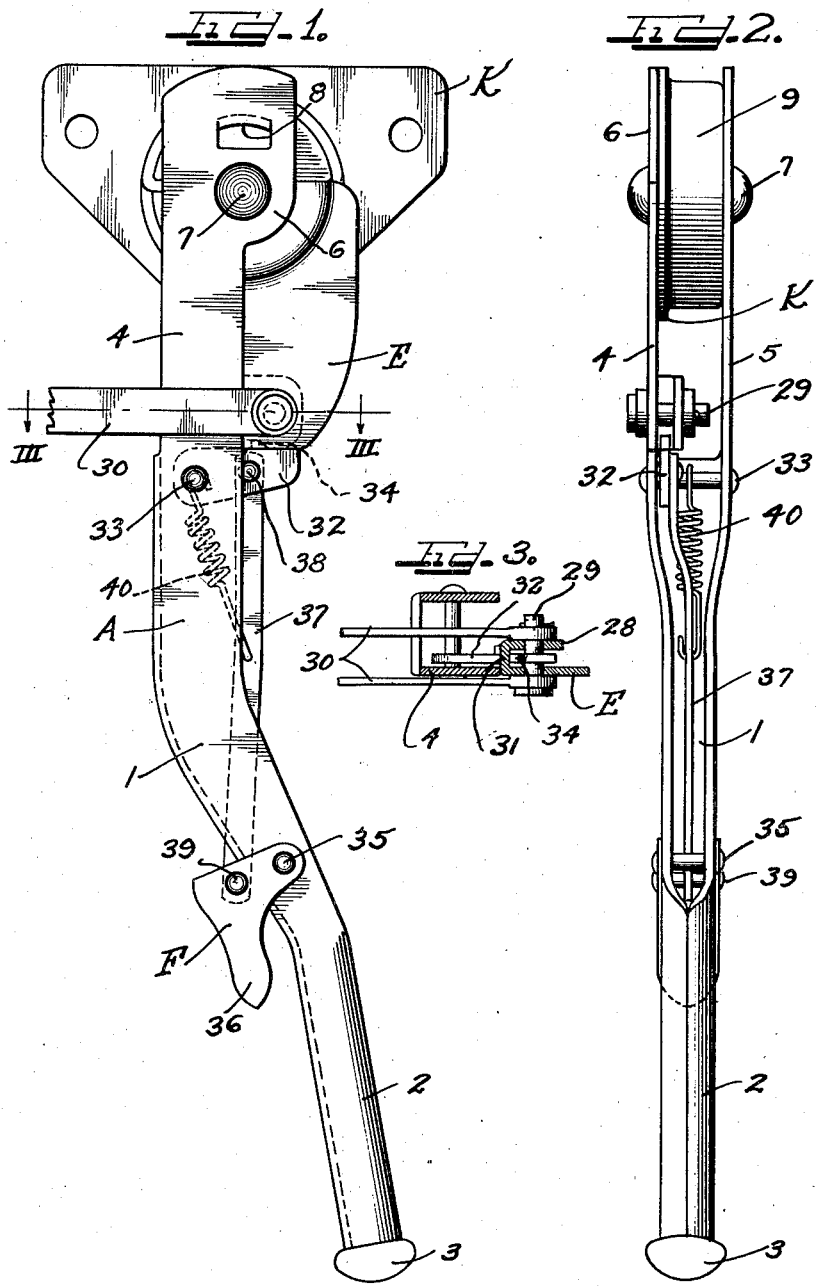
April 11, 1939. R. A. SANDBERG 2,154,215
SPRING FRICTION BRAKE LEVER
Filed July 31, 1937 2 Sheets-Sheet 1
Inventor
RAY A. SANDBERG.

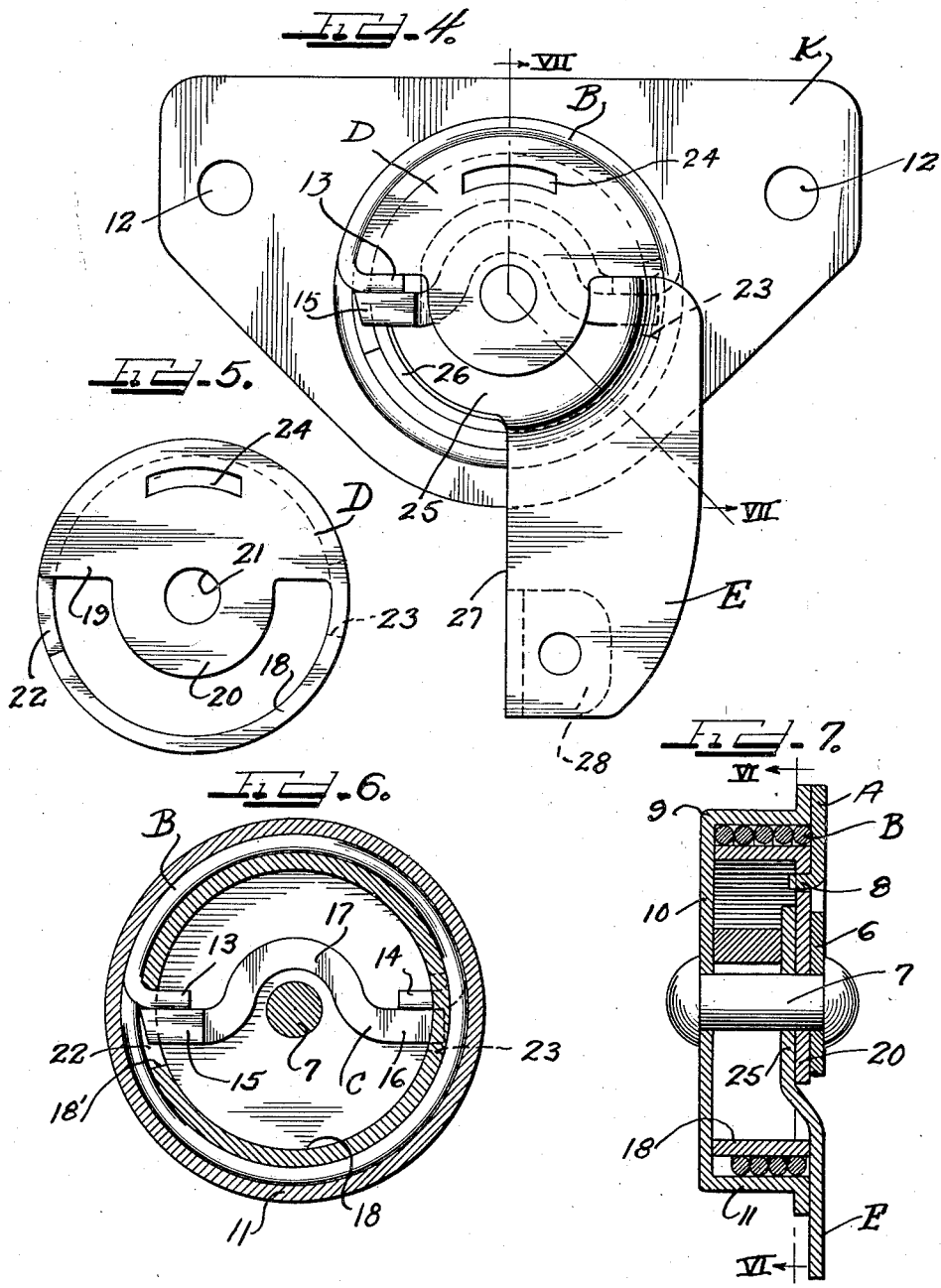

2,154,215

UNITED STATES PATENT OFFICE 2,154,215

SPRING FRICTION BRAKE LEVER

Ray A. Sandberg, Waukegan, Ill., assignor, by mesne assignments, to Houdaille-Hershey Corporation, Detroit, Mich., a corporation of Michigan Application July 31, 1937, Serial No. 156,638

4 Claims. (Cl. 74—531)

The present invention relates to a spring friction brake lever and more particularly an emergency brake lever for automotive vehicles.

Recently emergency brake levers of automotive vehicles, have been mounted behind the instrument boards of the vehicles with the levers depending from their pivotal supports, which supports are fastened behind the instrument boards. When such levers are moved to set the brakes, the grip portions of the same extend outwardly at angles to the instrument boards, and in front of the boards.

Recently, automobile manufacturers have been installing emergency brake levers of the friction type for the purpose of eliminating the clicking noise which is present in the usual pawl and ratchet types of levers.

Where friction type levers have been mounted as dash type levers and the control member of the levers swung to brake setting position, it has been found that oftentimes the vehicle driver in leaving or entering the driver's seat will accidentally hit the control member with his knee and thus accidentally release the brakes. Then too, oftentimes children playing in or about automotive vehicles sometimes accidentally hit the brake levers and when these are of the friction type, the brakes are released. Where the vehicles are parked on inclines, such as hills or ramps, such accidental brake release permits the vehicles to move, sometimes with disastrous results.

The brake lever construction of the present invention contemplates a spring friction type lever wherein the control member is latched against accidental displacement after it has been moved to a position to set the brakes.

The invention also contemplates the provision of means for latching the control member to the crank or lever member to which the brake mechanism is connected so that when the control member is moved to brake setting position, and is accidentally hit, the force attendant on such accidental hitting will tend to increase the frictional engagement of the crank and prevent accidental brake release.

The invention also contemplates and has for a further object the provision of an emergency brake lever construction for automotive vehicles for eliminating the usual pawl and ratchet construction of brake levers.

Another object of the present invention is to provide a friction type emergency brake lever for automotive vehicles.

A further object of the present invention is to provide a friction type brake lever construction for automotive vehicles, wherein an accidental release of the brake is prevented.

A still further object of the present invention is to provide an emergency brake lever construction for automotive vehicles which may be manufactured in quantity lots at low manufacturing costs.

The above, other and further objects of the present invention will be apparent from the following description and accompanying drawings.

The accompanying drawings illustrate an embodiment of the present invention and the views thereof are as follows:

Figure 1 is a side elevational view of an emergency brake lever of the dash type constructed in accordance with the principles of the present invention and with the control member latched to the crank.

Figure 2 is an edge elevational view of the lever of Figure 1 looking at the right-hand margin of Figure 1.

Figure 3 is a sectional view, taken substantially in the plane indicated by line III—III of Figure 1, and showing a portion of the yoke in plan.

Figure 4 is an enlarged elevational view, with the control member removed, and showing the relationship of certain of the parts, as well as details of construction.

Figure 5 is a plan view of a ring member which is integrally connected to the control member.

Figure 6 is a sectional view taken substantially in the plane indicated by the line VI—VI of Figure 7, showing the parts as the same appear in Figure 4.

Figure 7 is a sectional view taken substantially as indicated by the annular line VII—VII of Figure 4.

The drawings will now be explained:

The control member or lever proper A is illustrated as formed as a stamping to provide a shank portion 1 which is of substantially channel shape in cross-section, a grip portion 2 at the lower end of the control member, which is of a tubular formation, with its end piece 3, and at its other end with parallel, spaced legs 4 and 5. The extremity of the leg 4 is enlarged at 6. The legs are shown as spaced a greater distance apart than the side walls of the shank portion 1 of the control member A. The enlargement 6 of the leg 4 of the control member is apertured to receive a pivotal connection 7 and also fashioned to provide an inturned lug 8. The other leg member 5 is apertured in register with the pivot aperture of the leg 4.

A plate K, is duly processed to form a drum 9, having a bottom 10 and an annular flange 11. The bottom 10 of the drum is parallel to the face of the plate, and as installed in the vehicle will be in vertical position. The plate is provided with suitable apertures 12 for receiving attaching bolts or rivets to connect the plate to a suitable support behind the instrument board of a vehicle.

Arranged within the drum 9 and with its convolutions against the inner face of the flange 11 is a helically coiled spring B having its ends 13 and 14 directed out of the cylindrical surface defined by its convolutions, and herein shown as directed inwardly toward the pivot 7. Normally the spring B is expanded against the inner surface of the flange 11 to frictionally engage the same in locking relation.

Within the drum and extending crosswise of the same, is a bridge member or yoke C having its ends 15 and 16 against the inturned ends 13 and 14 respectively, of the spring so positioned as to spread the convolutions of the spring into increased frictional engagement with the flange 11, when any force is applied to either end of the bridge member or yoke. The yoke has a central portion 17 which is deflected out of its length to pass around the pivot 7, as may be observed in Figure 6.

A ring member D having a peripheral flange 18 and having an end wall 19 with a central portion 20 apertured at 21 to receive the pivot 7, is arranged within the spring B and with the outer surface of its peripheral portion closely adjacent the convolutions of the spring. The ring member D cooperates with the flange 11 of the drum to maintain the convolutions of the spring in proper relation and prevent any part of any convolution from being displaced, generally from the cylindrical surface defined by the convolutions. The peripheral portion 18 of the ring member D is notched as at 22, on its top margin, to receive the end 15 of the bridge or yoke member C and the end 13 of the spring, and on its opposite under portion as at 23 to receive the other end 16 of the yoke B and the end 14 of the spring, as shown in Figure 6. The notch 22 is of sufficient circumferential extent to receive in it the inturned end 13 of the spring B, the end 15 of the yoke D, and to afford additional space so that the ring member may be rotated relatively to the spring.

The control member A has a lug 8 formed out of the portion 6 thereof and entered in an arcuate slot 24 formed in the wall 19 of the ring member D. The width of the lug 8 is substantially that of the length of the slot so that the control member A and the ring member D are thus secured together intimately against relative rotative movement and in fact constitute a single operative member.

Whenever the control member A is swung in either direction about the pivot 7, the peripheral flange 18 of the ring member D, under the part 19, will engage either of the ends of the spring to contract said spring and thus permit rotative movement of the spring with respect to the drum.

A crank E formed of flat sheet metal and to which the brake mechanism of the vehicle is operatively connected, has a pivotal region 25 apertured to receive the pivot 7 and is formed with an arcuate flange 26 adapted to engage the end 15 of the yoke member C, when the crank is moved in clockwise direction as viewed in the drawings. The crank E has a straight margin 27 which is adapted to make longitudinal contact with a portion of the leg 4 of the control member A as the latter is moved in a direction to set the brakes. The crank E is also provided with a rearwardly and inturned lug 28 which provides bearing for a pin 29 which pivotally connects a yoke 30 to the crank E. The yoke is connected by means not shown in the brake mechanism of the vehicle. The yoke 30 in the form illustrated includes two legs which straddle the leg 4 of the control member A. The backturned portion 31 of the lug 28 constitutes a keeper for a purpose to be later explained.

A pawl 32 is pivoted as at 33 to the control member A, and is provided with a tooth 34 for locking engagement with the keeper 31 when the control member A is in contact with the margin or edge 27 of the crank E as illustrated in Figure 1. Engagement of the tooth 34 of the pawl with the keeper 31 latches the control member A to the crank E to thus prevent relative rotative movement between them.

For releasing the pawl from latched engagement with the keeper 31, a release finger F is pivoted at 35 to the shank of the lever above the grip portion 2, and has a finger piece 36. A link 37 pivoted at 38 to the pawl 32 and at 39 to the release member F causes unlatching of the pawl from the keeper when the member F is swung in counterclockwise direction as viewed in Figure 1. For normally maintaining the pawl in latched engagement with the keeper 31, a spring 40 is utilized, shown in the present instance as having one end hooked over the pivot 33 of the pawl and the other end engaged through an opening in the link 37.

The operation of the brake lever construction of the present invention is as follows:

To set the brakes, the operator grasps the grip portion 2 of the control member A and swings it in counterclockwise direction about its pivot. This movement of the control member will cause like movement of the crank E as the leg 4 of the control member abuts the crank. Such movement of the control member will, through the ring member D, cause engagement of the peripheral portion 18 thereof with the inturned end 13 of the spring B to release the spring from frictional engagement with the flange 11 of the drum, and permit rotative movement of the spring and crank. When the lever has been swung to a position to set the brakes, the operator releases his grip of the member 2 whereupon the tension imposed on the crank E by the pull of the brake mechanism will tend to swing the crank E and control member A in clockwise or counter direction. Such tendency to swing in the manner stated, will cause the flange 26 of the crank E to bear against the end 15 of the yoke member C and force it against the end 13 of the spring to expand the spring into tight frictional engagement with the flange 11 of the drum and thus lock the crank in its then position.

Because of the fact that the control member A is latched to the crank E by engagement of the pawl 32 with the keeper 31, any force applied against the control member A to move it in counter direction, that is, in clockwise direction as viewed in Figure 1, will tend to increase the friction engagement of the spring against the drum and thus prevent accidental release of the brakes, as such force will tend to swing crank E in a direction to further expand the spring B.

To release the lever from brake setting position, the operator rocks the member F about its pivot 35 in counterclockwise direction which disengages the pawl 32 from latched engagement with the keeper 31, whereupon the control member 2 is then swung in clockwise direction. Such swinging movement will cause engagement of the periphery 18 of the ring D with the end 14 of the spring to contract the spring and thus release it from its frictional engagement with the drum whereupon the spring and crank E are moved to off position. When the frictional engagement of the spring B against the flange 11 is released as described, the crank E is returned to off position by reason of the pull of the brake mechanism thereto applied.

When the control member A has been moved to off position, the pull of the brake mechanism on the crank E will move it into latched engagement with the control member A, as illustrated in Figure 1.

Release member F is positioned far enough along the length of the control member A so as to be avoided when the driver makes a hasty grab at the grip portion 2 of the lever, thus assuring latched engagement of the control member A and the crank E when the latter has been moved to brake setting position. It will be observed, from Figure 7, that the pivotal region 25 of the crank E lies underneath the central portion 20 of the ring member D and that the leg 6 of the control member A lies on top of the end wall 19 of the ring member D.

As shown in Figure 4, the major portion of the length of the crank E is included in the plane of the leg 4 of the control member A to assure abutting relationship between the margin 27 of the crank and the adjacent margin of the leg of the control member.

The provision of the bridge member or yoke C affords line contact between the ends of the yoke and the inturned ends 13 and 14 of the spring to thus relieve these ends of any shearing stress which would be applied to them by the contacting portion of the crank when moved in brake setting position, were the yoke eliminated. This construction prolongs the life of the spring B and makes possible the efficient operation of the lever.

The only shearing force applied to the end of the spring is that applied by the flange 18 of the ring member D when the control member A is moved in a direction to contract the spring, which force is insufficient to cause any damage to the ends of the spring, as but a slight application of force is necessary to contract the spring sufficiently for moving it wtih respect to the flange of the drum.

For convenience of manufacture, the ring member D has been made separate from the control member A, although it is to be understood that these parts might be integrally formed if it were found commercially expedient so to do, without adding materially to manufacturing costs.

It will be observed that the brake lever of the present invention is so constructed that when the control member A has been moved to brake setting position, the latch release F is on the rear side of the grip out of the way for accidental contact by anybody entering or leaving the vehicle, thus assuring positive locking of the control member against accidental movement in brake releasing direction.

I am aware that many changes may be made and numerous details of construction may be varied through a wide range without departing from the principles of this invention, and I, therefore, do not purpose limiting the patent granted hereon otherwise than is necessitated by the prior art.

The invention is claimed as follows:

1. An automotive vehicle emergency brake lever construction including a control member and a crank, said crank being operatively connected with the brake mechanism of the vehicle, a drum having a cylindrical flange, a helically coiled spring having its convolutions in a cylindrical surface and normally in frictional engagement with said drum flange and having its ends deflected out of the cylindrical surface of its convolutions, said control member being pivotally movable about the drum axis and having a part engaging with said spring ends to release the spring from frictional engagement with the drum flange whereby said spring may be turned in either direction of rotation about the drum axis, a yoke within said drum arranged with its ends against the spring ends and so disposed with respect to said ends as to expand said spring into frictional engagement with said drum flange when pressure is applied to said yoke, said crank being pivotally mounted on the drum axis and having a part engageable with said yoke to tighten and frictionally lock the spring to the drum flange when the crank tends to move in retrograde direction under influence of tension of the brake mechanism after said crank has been moved by said control member to brake setting position, said control member and crank having cooperating parts to latch them together against relative movement in retrograde direction to thereby prevent any force unintentionally applied to said control member which would otherwise move it in retrograde direction, from so moving said control member and crank, and thereby accidentally releasing the brakes; and manually operable means carried by said control member for unlatching said cooperating parts to allow intentional movement of the control member in a direction to release the brakes.

2. A brake lever construction for an automotive vehicle including means providing a flanged drum having a wall along one margin of the flange, a primary and a secondary lever each having arcuate parts within the drum inwardly of the flange, a pivot extending axially of the drum wall and flange, said levers being coaxially mounted on said pivot for oscillatory movement, said secondary lever being operatively connected to the brake mechanism of the vehicle, a helically coiled spring arranged with its convolutions against said flange and its ends projecting inwardly of the flange and constituting lugs, the arcuate part of said primary lever being so positioned with respect to the spring as to cooperate with said flange to maintain the spring convolutions in position during expansion and contraction of the spring and provided with notches for said lugs of such circumferential extent as to allow movement of the lugs with respect to the said part, a yoke member extending across the interior of said drum and having its ends in engagement with said lugs, said yoke member being centrally offset to extend about said pivot, the arcuate part of the primary lever within the drum adapted on oscillation of the lever in either direction to engage one of said lugs to contract the spring and free it from frictional engagement with the flange and oscillate the spring in either direction, the arcuate part of the secondary lever within the drum being contacted by the yoke member as the primary lever is swung to swing the secondary lever in the same direction as the primary lever, and means latching said levers together to prevent accidental movement of the primary lever in counter direction, the construction being such that any force accidentally applied to the primary lever tending to move it in counter direction will increase the frictional engagement of the spring with the flange by the latched connection of said levers, and manually operable means for releasing the latch to allow movement of the primary lever in counter direction to release the brakes.

3. A brake control apparatus including a tensioned brake element, a crank connected to said brake element, a control lever coaxially pivoted with respect to said crank and movable with and with respect to said crank, said crank and lever having abutting parts for causing movement together to apply the brakes and allowing independent movement of the lever to release the brakes, and means positively latching said abutting parts together when the lever and crank have been moved to brake setting position to thereby prevent accidental movement of the lever in release direction.

4. In an automotive vehicle emergency brake lever construction, two coaxially pivoted oscillatory members, one member being connected to the brake mechanism and the other constituting a control member, means adapted to latch said members together when in brake setting position to prevent accidental pressure against said control member from releasing the brakes, and means carried by the control member for unlatching said first mentioned means to enable movement of the control member to release the brakes.

RAY A. SANDBERG.